(12) United States Patent
Fluch (10) Patent No.: US 11,529,796 B2
(45) Date of Patent: Dec. 20, 2022

(54) COATED SHEET METAL BAND AND PRODUCTION METHOD

(71) Applicant: voestalpine Stahl GmbH, Linz (AT)

(72) Inventor: Ronald Fluch, Linz (AT)

(73) Assignee: VOESTALPINE STAHL GMBH, Linz (AT)

( * ) Notice: Subject to any disclaimer, the term of this patent is extended or adjusted under 35 U.S.C. 154(b) by 0 days.

(21) Appl. No.: 17/048,800

(22) PCT Filed: Apr. 12, 2019

(86) PCT No.: PCT/EP2019/059476
§ 371 (c)(1),
(2) Date: Oct. 19, 2020

(87) PCT Pub. No.: WO2019/201788
PCT Pub. Date: Oct. 24, 2019

(65) Prior Publication Data
US 2021/0146657 A1 May 20, 2021

(30) Foreign Application Priority Data

Apr. 20, 2018 (DE) ............... 10 2018 206 151.3

(51) Int. Cl.
*B32B 15/04* (2006.01)
*B32B 7/10* (2006.01)
(52) U.S. Cl.
CPC ............. *B32B 15/043* (2013.01); *B32B 7/10* (2013.01); *B32B 2255/06* (2013.01); *B32B 2255/26* (2013.01); *B32B 2307/306* (2013.01)

(58) Field of Classification Search
CPC ..... B32B 15/043; B32B 7/10; B32B 2255/06; B32B 2255/26; B32B 2307/306;
(Continued)

(56) References Cited

U.S. PATENT DOCUMENTS 10,755,842 B2 * 8/2020 Kern ................. B32B 27/306
2015/0314563 A1 * 11/2015 Fluch ................ B32B 7/12
156/256

(Continued)

FOREIGN PATENT DOCUMENTS

AT 512931 A4 12/2013
AT 516197 A1 3/2016
(Continued)

OTHER PUBLICATIONS

Machine translation of WO 2015/041281 A1 (Year: 2015).*
(Continued)

*Primary Examiner* — Callie E Shosho
*Assistant Examiner* — Steven A Rice
(74) *Attorney, Agent, or Firm* — Staas & Halsey LLP (57) ABSTRACT

A coated sheet metal strip includes a rolled sheet metal strip having a first flat side and a second flat side. A first layer over the first flat side includes a carrier layer. The carrier layer contains a reaction accelerator for an adhesive and stores the reaction accelerator on a physical basis. A second layer, including the adhesive, is applied over the second flat side. The second layer is free of the reaction accelerator or any reaction accelerator.

19 Claims, 3 Drawing Sheets (58) Field of Classification Search
CPC ....... B32B 15/18; B32B 7/12; B32B 2457/00; H01F 3/02
USPC ........................................................ 428/457
See application file for complete search history.

(56) References Cited

U.S. PATENT DOCUMENTS

2016/0120077 A1* 4/2016 Watanabe ............ H05K 9/0081
                                                    174/377
2018/0082773 A1   3/2018 Kern et al.

FOREIGN PATENT DOCUMENTS

| DE | 3503019 A1 | 7/1986 | | |
|---|---|---|---|---|
| DE | 696 11 009 T2 | 6/2001 | | |
| DE | 10 2008 026 613 A1 | 12/2009 | | |
| DE | 10 2015 012 172 A1 | 3/2017 | | |
| EP | 0 756 297 B1 | 11/2000 | | |
| WO | 97/30504 A1 | 8/1997 | | |
| WO | WO-2015041281 A1 * | 3/2015 | ............. | B32B 15/08 |
| WO | 2016/033630 A1 | 3/2016 | | |

OTHER PUBLICATIONS

International Search Report, dated May 24, 2019, in PCT Application No. PCT/EP2019/059476.
Notification of the First Office Action dated Mar. 29, 2022 in Chinese Patent Application No. 2017106999785 (6 pages).
Written Opinion of the Search Authority, dated May 24, 2019, in PCT Application No. PCT/EP2019/059476 (8 pages) (5 pages English Translation).

* cited by examiner

COATED SHEET METAL BAND AND PRODUCTION METHOD

CROSS REFERENCE TO RELATED APPLICATIONS

This application is a U.S. national stage of International Application No. PCT/EP2019/059476 filed on Apr. 12, 2019. The International Application claims the priority benefit of German Patent Application No. 10 2018 206 151.3 filed on Apr. 20, 2018. Both International Application No. PCT/EP2019/05947 and German Patent Application No. 10 2018 206 151.3 are incorporated by reference herein in their entirety.

BACKGROUND

Described herein is a coated sheet metal strip and a method for producing a coated sheet metal strip.

Coated sheet metal strips are used in many areas of technology. By way of example, in the form of what are known as electrical sheet strips, they form the starting material for the construction of electrical cores which are used in generators, electric motors, transformers or other electrical devices. Such electrical cores are produced by cutting the coated electrical sheet strip into individual sheet metal laminations, stacking the sheet metal laminations and adhesively bonding these together to form a lamination stack. In addition, adhesively bonded-together, coated sheet metal strips or sheet metal laminations may also be used in applications outside of electrical cores.

In order to enable simple adhesive bonding of the sheet metal laminations in such, or other, applications, it is already known to cover the rolled sheet metal strip on one or both flat sides with an adhesive layer, for example a baking lacquer layer. This makes it possible to construct the lamination stacks directly from the sheet metal laminations obtained by cutting the coated sheet metal strip, without requiring intermediate work steps such as, for example, painting or applying adhesive. It is not until during the adhesive bonding process (baking of the lamination stack) that the adhesive layer is activated and the lamination stack obtains its dimensional stability.

A known disadvantage in the production of sheet metal lamination stacks by an adhesive bonding process is that the adhesive bonding process is comparatively time-consuming compared to alternative measures (for example screwing or bracing the sheet metal laminations, etc.). The adhesive bonding time in a known baking process typically extends over a plurality of hours, as a result of which the production of electrical cores (lamination stacks) becomes expensive and time-consuming.

A further disadvantage in the precoating of sheet metal strips with an adhesive is that the liquid adhesive in the state in which it has not yet been applied exhibits low storage stability and displays a tendency to rapid aging after application. In practice, this means that the liquid adhesive can be stored at most only for about half a year before it needs to be applied to the sheet metal strip. The adhesive applied to the sheet metal strip must then be activated (adhesively bonded) after half a year at the latest since the lamination stack (e.g. electrical core) would otherwise not possess the desired (high) mechanical stability.

The low storage and aging stability of adhesive-coated sheet metal strips thus represents a problem concerning both the manufacturer and the purchaser of the coated sheet metal strips and accordingly greatly hinders the market penetration of adhesive-coated sheet metal strips for the production of lamination stacks.

For example, German Patent Application No. 10 2015 012 172 A1 describes a thermally activatable fast-curing adhesive layer consisting of an epoxy resin, a latent hardener and a latent accelerator.

For example, WIPO Patent Publication No. 2016/033630 A1 describes a method for producing a baking lacquer-coated sheet metal strip in which a catalyst is applied directly to the baking lacquer layer.

For example, German Patent Application No. 35 03 019 C2 describes an electrical sheet strip coated with an adhesive layer and an insulating layer, where the insulating layer consists of an already cured adhesive layer.

For example, European Patent Application No. 0 756 297 B1 describes an electrical sheet coated on both sides, in which both coatings have a different composition and at least one of the coatings contains a curing accelerator from the chemical group of the amino resins.

SUMMARY

An aspect of the disclosure can be considered to be that of providing a coated sheet metal strip which, as a starting material for components constructed from adhesively bonded sheet metal laminations, has advantageous properties in particular in relation to the storage stability and/or aging stability and the production process. The disclosure furthermore aims to specify a method for producing a coated sheet metal strip having the properties mentioned.

Aspects of the disclosure may be achieved by the features of the independent claims. Example embodiments and developments are the subject matter of the dependent claims.

Accordingly, a coated sheet metal strip includes a rolled sheet metal strip having a first flat side and a second flat side. A first layer extends over the first flat side and includes a carrier layer which contains a reaction accelerator for an adhesive and stores same on a physical basis. A second layer, which includes the adhesive, extends over the second flat side. The carrier layer may for example be applied directly to the sheet metal strip. The second layer is free of the reaction accelerator of the first layer or free of any reaction accelerator.

By applying the adhesive layer and the reaction accelerator to different sides of the sheet metal strip, the adhesive and the reaction accelerator are decoupled. As a result, the storage stability of the liquid adhesive before application to the sheet metal strip and the aging stability of the adhesive layer after the coating process are significantly increased compared to known solutions employing an admixed reaction accelerator. At the same time, the adhesive bonding process after the coupling of the two layers can be kept short because of the presence of the reaction accelerator. The first layer thus forms a depot coating in which the reaction accelerator incorporated in the carrier layer is kept ready for its later use.

The coated sheet metal strip can therefore comprehensively meet the desired requirements in terms of storage stability and aging stability and also short adhesive bonding time and high mechanical stability of the lamination stack produced from the sheet metal strip.

A small amount of adhesive, which promotes the storage of the reaction accelerator in the carrier layer via a chemical process, may be added to the carrier layer material of the first layer. The amount of adhesive is in this case small, for example less than or equal to 20 vol. % or 10 vol. % of the carrier layer.

The ratio of carrier layer material of the carrier layer (with or without a small proportion of adhesive) to reaction accelerator may for example be between 1/1 and 3/1 and in particular be approximately 2/1 (in vol. %).

For example, the first layer may include the carrier layer containing the reaction accelerator.

The carrier layer can for example include an organic resin, polyvinyl alcohol (PVA) and/or phenoxy resin or include one or more of these substances.

The reaction accelerator can for example include a urea or a urea derivative, a Lewis base (e.g. tertiary amines), a Lewis acid (e.g. $BF_3$) or an imidazole, in particular 1-methylimidazole, 2-methylimidazole, 2-ethyl-4-methylimidazole (2E4Mlm), or other imidazole derivatives or imidazole adducts, or include one or more of these substances.

Imidazoles are effective catalysts for the polymerization of resins, for example of epoxy resins. Furthermore, modified or heterocyclic amines may also be used as reaction accelerators.

The first layer can be a largely or completely adhesive-free layer. That is to say that the first layer can include less than or equal to 20 vol. % adhesive, in particular less than or equal to 10 vol. % adhesive, or is free of adhesive. In this context, "adhesive" can mean the adhesive of the second layer or any adhesive which interacts with the reaction accelerator. In this context, "adhesive-free" can mean free of the adhesive of the second layer or free of any adhesive which interacts with the reaction accelerator.

However, the first layer can also include a proportion of adhesive of higher than 20 vol. % adhesive, for example more than or equal to 30 vol. %, 40 vol. %, 50 vol. %, 60 vol. % or 70 vol. % adhesive.

If the first layer includes a proportion of adhesive, the reaction accelerator may then react with the adhesive (for example the imidazole as an example reacts with the epoxide group of the baking lacquer, that is to say the example adhesive), resulting in the production as it were in situ of the reaction accelerator adduct (e.g. imidazole adduct) in the first layer (i.e. the "depot layer").

The example imidazole adduct (or generally the reaction accelerator adduct) is embedded in the carrier layer, that is to say for example in the relatively hard phenoxy resin. In the case of less than 20 vol. % of adhesive (e.g. baking lacquer), the hardness of the carrier layer dominates (that is to say for example of the phenoxy resin). This has the advantage that the first layer ("depot coating") is harder. This advantage comes into play when the coated sheet metal strip is wound into a coil and high pressures prevail as a result of the intrinsic weight of the coil.

Experiments have shown, however, that more than 20 vol. % of adhesive is also possible in the first layer. By way of example, 30 vol. % of adhesive (e.g. baking lacquer), in the same way as 40 vol. % of adhesive, in the same way as 50 vol. % of adhesive, in the same way as 60 vol. % of adhesive, in the same way as 70 vol. % of adhesive, lead to a better homogeneity of the entire coating system after the adhesive bonding, that is to say when the reaction accelerator has been released into the second layer from the first layer. The advantage of more adhesive in the first layer is additionally that more imidazole (or in general: reaction accelerator) can be bound by it.

In other words, it has been found that it can be advantageous if the reaction accelerator has a carrier such as for example the adhesive and hence a reaction accelerator adduct is formed in situ.

Besides imidazole, an imidazole derivative can also be used as a reaction accelerator. This may be advantageous since "free of adhesive" in relation to the first layer does not work, or only works to a very limited extent, with pure imidazole and instead only works when imidazole is present as a higher molecular weight imidazole derivative or imidazole adduct.

The thickness of the first layer can be selected to be less than or equal to 2 μm, 1 μm or 0.5 μm. The thickness of the first layer can be selected to be greater than 50 nm, 100 nm or 250 nm. As a result of the fact that the reaction accelerator is accommodated in a layer (depot layer) of comparatively low thickness, it can easily reach the adhesive of the second layer by diffusion (i.e. via short diffusion path lengths) during the thermal adhesive bonding process.

The first layer can be free of mineral fillers. This can facilitate the passage of the reaction accelerator into the second layer (adhesive layer).

The first layer can be substantially or completely free of any adhesive and in particular of that adhesive upon which the reaction accelerator acts. As a result, an undesired reaction process with the reaction accelerator can be prevented. The first layer may be completely free of adhesive. However, for example, the proportion of adhesive as a whole in the first layer of for example up to 20 vol. % or even more (e.g. 30 vol. %, 40 vol. %, 50 vol. %, 60 vol. % or 70 vol. %) can be added without bringing about undesired 3-dimensional crosslinking. The proportion of adhesive upon which the reaction accelerator acts (e.g. a baking lacquer or the adhesive of the second layer) can in this case include a maximum of 10 vol. %. Vol. % figures relating to the adhesive in the first layer are based on the entire volume of the first layer.

The second layer can be an epoxy resin-based layer and/or a baking lacquer layer, in particular an epoxy resin-based baking lacquer layer. These layers enable high bonding forces and a good electrical insulation effect.

In particular, the coated sheet metal strip can be an electrical sheet strip used for the construction of electrical cores. However, the disclosure of this document also encompasses sheet metal strips the adhesive bonding of which produces components which are not electrical cores.

The coated sheet metal strip may for example be rolled up in the form of a coil (winding, roll, spool). An undesired pre-reaction in the coil can be suppressed here by way of a suitable material for the carrier layer having a high binding power with respect to the reaction accelerator (at ambient temperature).

A method for producing a coated sheet metal strip can for example include applying a first layer over a first flat side of a rolled sheet metal strip, wherein the first layer includes a carrier layer which contains a reaction accelerator for an adhesive and stores the reaction accelerator on a physical basis, and applying a second layer, which includes the adhesive, over a second flat side of the rolled sheet metal strip. The first layer, containing the reaction accelerator (activator), (so-called depot coating) can therefore—just like the second layer which contains the adhesive—already be applied to the virtually endless sheet metal strip.

The carrier layer may for example be applied directly to the sheet metal strip.

The first layer can be adhesive-free or, as already mentioned, can optionally contain a small proportion of adhesive. As already mentioned, the second layer can be free of the reaction accelerator of the first layer or free of any reaction accelerator.

For example, the first layer and/or the second layer can each be applied by roller application. Other application methods, such as for example printing methods or spray methods, are also possible.

The method can furthermore include drying the coated sheet metal strip at a drying temperature of less than or equal to 280° C., 270° C., 260° C. or 250° C. By using a relatively low drying temperature, it can be achieved that the reaction accelerator for the main part remains in the carrier layer material of the first layer, that is to say is not expelled, or is so only to a minor extent.

According to a further aspect, a coated sheet metal strip can include a rolled sheet metal strip having a first flat side and a second flat side, wherein a first layer, including a reaction accelerator for an adhesive (of which the first layer may for example be free), is arranged over the first flat side and a third layer, including an adhesive-free insulating lacquer layer, is arranged over the second flat side. Such a sheet metal strip coated with insulating lacquer and having a depot coating can likewise be used as a precursor material for the construction of components including sheet metal laminations, for example electrical cores. The adhesive bonding in this case is effected using sheet metal laminations which are produced from a further sheet metal strip which is provided on a first flat side with the adhesive layer and on the second flat side either is uncoated or also provided with an insulating lacquer layer. The reaction accelerator present over the first flat side in the sheet metal strip having a depot coating is therefore provided here to interact in the adhesive bonding process with the adhesive layer provided on the other sheet metal strip.

With respect to the first layer, the sheet metal strip coated with insulating lacquer and having a depot coating can have all features, individually or in combination, which are mentioned in connection with the coated sheet metal strip.

The third layer (adhesive-free insulating lacquer layer) can have a thickness in accordance with the thickness specifications for the second layer in the coated sheet metal strip.

"Insulating lacquer layers" in this document refers to layers which are electrically insulating but which do not enable any effective adhesive bond in the later adhesive bonding process.

"Adhesive layers" in this document refers to layers which in the adhesive bonding process bring about the adhesive bonding of the sheet metal laminations in order to achieve the dimensional stability of the component through three-dimensional crosslinking reactions (i.e. chemically). In addition, adhesive layers may optionally also bring about sufficient electrical insulation between the adhesively bonded sheet metal laminations (for example baking lacquer layers function both as adhesive layers and as electrical insulation layers). However, for some components constructed from adhesively bonded sheet metal laminations it may also be provided that the adhesive layer does not ensure any electrical insulation guarantee or possibly even is electrically conductive.

Hereinafter, example embodiments and developments are elucidated in an example manner on the basis of the schematic drawings, a different degree of detail being used in some of the drawings. Like reference signs denote the same or similar parts.

DETAILED DESCRIPTION

Terms such as "application" or "applying" and other similar terms (e.g. "applied") in the description should not be understood to mean that the applied layers must be in direct contact with the surface upon which they are applied. Intervening elements or layers may be present between the "applied" elements or layers and the underlying surface. However, the abovementioned or similar terms in this disclosure can also have the specific meaning that the elements or layers are in direct contact with the underlying surface, that is to say that there are no intervening elements or layers.

The term "over", which is used in relation to an element or a material layer which is formed or applied "over" a surface, may be used here in the sense that the element or the material layer is applied "indirectly onto" the surface, with intervening elements or layers between the surface and the element or the material layer possibly being present. However, the term "over" may also have the specific meaning that the element or the material layer which is applied "over" a surface is applied "directly onto", that is to say in direct contact with, the relevant surface. The same applies analogously to similar terms such as for example "overlying", "below", "underlying", etc.

Figure 1:
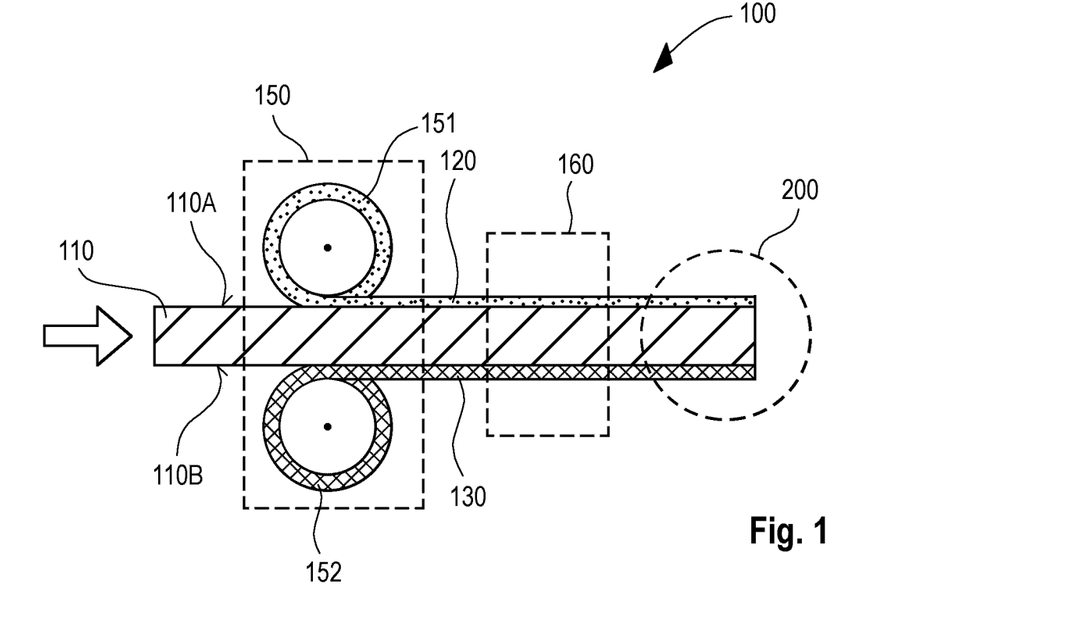
FIG. 1 is an example process of applying a first layer having reaction accelerator and a second layer having adhesive over opposite flat sides of a rolled sheet metal strip.

FIG. 1 shows, in an example manner, a method 100 for producing a coated sheet metal strip 200 in accordance with one aspect of the disclosure. The starting product of the method 100 is a rolled sheet metal strip 110. The sheet metal strip 110 can for example include steel. The sheet metal strip 110 can for example be an electrical sheet strip which is provided for the construction of electrical cores. The rolled sheet metal strip 110 can be in the form of a virtually endless sheet metal strip 110 in a continuous belt run (see arrow P), for example in a steelworks.

The sheet metal strip 110 can be for example a cold-rolled sheet metal strip or electrical sheet strip in the finally annealed state. Other sheet metal strips, for example non-finally annealed sheet metal strips or electrical sheet strips are likewise possible.

The sheet metal strip 110 is supplied to a coating system 150. In the example illustrated here, the coating system 150 is illustrated as a double-sided coating system 150. However, it is also possible for the top-side and bottom-side coatings to be applied in different coating systems which each coat just one flat side of the rolled sheet metal strip. In addition, it is possible for one or both coatings to be performed by means of a multiple coating system, that is to say to apply these respectively in multiple coating steps.

In FIG. 1, a first layer 120 is applied over a first flat side 110A of the rolled sheet metal strip 110, and a second layer 130 is applied over a second flat side 1106, lying opposite the first flat side 110A, of the rolled sheet metal strip 110.

The first layer 120 is a so-called depot coating which contains a reaction accelerator for an adhesive. The first layer can be largely or completely adhesive-free with respect to that adhesive for which the reaction accelerator is intended, that is to say that it is not present or is only present to a minor extent (for example less than or equal to 20 vol. % or 10 vol. %) in the first layer 120. The same can apply for any adhesive which interacts with the reaction accelerator. The first layer 120 can also be completely adhesive-free in the sense that no adhesive at all is present in the first layer 120.

Figure 3:
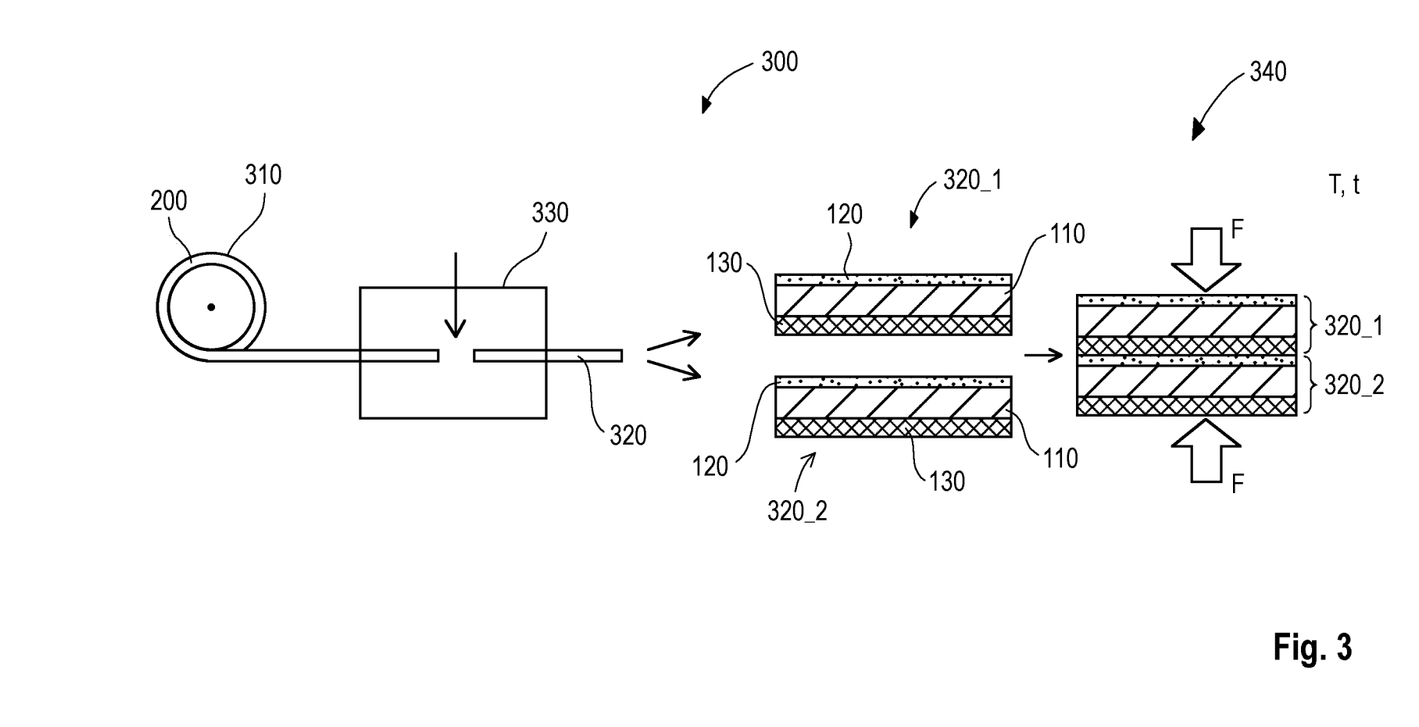
FIG. 3 is an example process for producing a component from adhesively bonded-together laminations of the sheet metal strip coated on both sides from FIG. 2.

On the other hand, it is also possible for the first layer 120 to include a higher proportion of adhesive, for example more than 30 vol. %, 40 vol. %, 50 vol. %, 60 vol. % or 70 vol. % adhesive, which results in better homogeneity of the entire coating system after the adhesive bonding of the coated sheet metal strip 110 or of the sheet metal laminations (sheet metal plates) 320 produced from the coated metal strip (see FIG. 3). This higher proportion of adhesive has proven advantageous in particular for low molecular weight reaction accelerators such as imidazole.

The reaction accelerator can be an activator or catalyst for the adhesive (not present in the first layer 120). That means that the reaction accelerator is capable, upon contact with the adhesive and thermal activation, of shortening the time required for the complete reaction of the chemical adhesive for example by more than or equal to a factor of 2, 3, 4, 5, 6, 7, 8, 9 or 10 compared to the time that would be required without a reaction accelerator.

The adhesive is present in the second layer 130 which is applied over the second flat side 1106 of the rolled sheet metal strip 110. The adhesive and the reaction accelerator are therefore separated during application and in the further belt run by the intervening sheet metal strip 110.

The first flat side 110A and/or the second flat side 1106 can be coated by means of roller application. For example, FIG. 1 illustrates two rollers 151, 152, which apply the first layer 120 and the second layer 130, respectively, for example wet. However, it is also possible for the layer application of the first and/or the second layer 120, 130 to be carried out by other methods, for example a spray process or a printing method.

The first and second layer 120, 130 can be applied either onto an uncoated, rolled sheet metal strip 110 or onto an already pre-coated sheet metal strip 110. For example, there may be present a pre-coating (not illustrated) in the form of a primer, upon which the first layer 120 and/or the second layer 130 are applied. It is also possible for the sheet metal strip 110 upstream of the coating system 150 in the belt run to already have been provided on one side or on both sides with an insulating lacquer layer, so that the first layer 120 and/or the second layer 130 are applied onto the previously applied insulating lacquer layer. Materials which may for example be used for an insulating lacquer layer are also mentioned hereinafter.

The first layer 120 and/or the second layer 130 may be applied onto the respective flat side 110A or 1106 of the rolled sheet metal strip 110 over the whole surface or only over a part of the surface. The second layer 130 can for example be produced with a degree of coverage of less than or equal to 80%, 60%, 40% or 20% of the area of the flat side 1106 of the sheet metal strip 110. The second layer 130 can for example be applied in a striped pattern. The first layer 120 may be applied onto the first flat side 110A over the whole surface; application over only part of the surface is also optionally possible for this layer, wherein the non-covered (left-open) areas should then also not be covered by the second layer 130.

A drying station 160 can be situated downstream of the coating system 150 in the belt run path. The drying system 160 can for example be designed as a continuous drying oven through which the coated sheet metal strip 110 continuously passes.

For example, the maximum temperature of the sheet metal strip 110 in the drying system 160 can be between 150° C. and 280° C., wherein temperature values of less than or equal to 270° C., 260° C., 250° C., 240° C., 230° C., 220° C., 210° C., 205° C., 195° C., 185° C., 175° C. or 165° C. can be provided.

The duration of the heat treatment in the drying system 160 can for example be between 10 s and 40 s and in particular less than, equal to or greater than 20 s or 30 s. As a result of a suitable choice of drying temperature and/or duration of the heat treatment, it can be ensured that the reaction accelerator remains completely or virtually completely in the first layer 120.

It is also possible to apply the reaction accelerator downstream of the drying system 160 in the belt run, for example in that the roller application by means of the roller 151 does not take place until downstream of the drying system 160, or in that the carrier layer of the first layer 120, as shown in FIG. 1, is applied upstream of the drying system 160 in the belt run but the reaction accelerator is applied by a further application process only downstream of the drying system 160.

In the drying system 160, the second layer 130 and optionally the first layer 120 are dried at least to the extent that these layers 120, 130 are mechanically stable and abrasion-resistant downstream of the drying system 160 in the belt run. This then enables the further handling of the dried, coated sheet metal strip 110, for example by deflection rollers or by winding it up into a coil. During the drying in the drying system 160, the adhesive in the second layer 130 is not yet activated, that is to say the chemical reaction (for example crosslinking) of the adhesive is not initiated or at least the adhesive is not reacted to completion.

Figure 2:
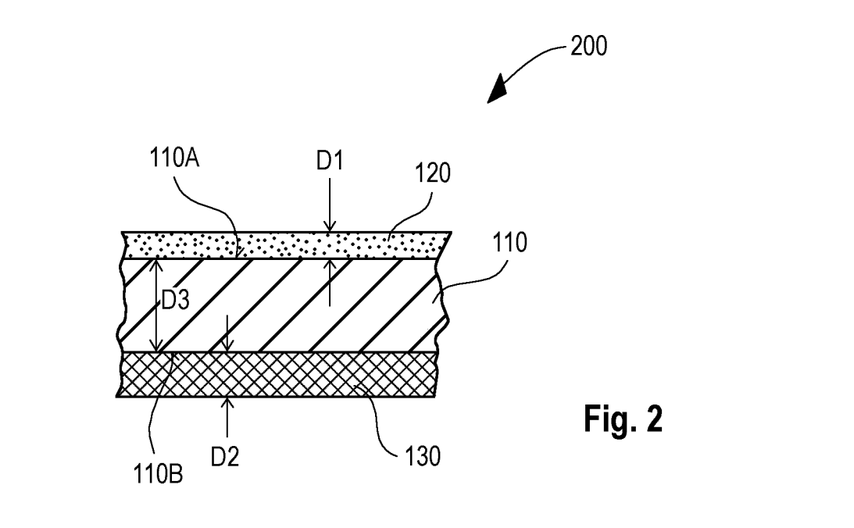
FIG. 2 is a cross section through a sheet metal strip coated on both sides, as can be produced for example by the process illustrated in FIG. 1.

FIG. 2 shows by way of example a sheet metal strip 200 coated on both sides and produced by the process conducted in FIG. 1. The first layer 120 can have a thickness D1 which is less than or greater than or equal to 0.5 μm, 1.0 μm or 2.0 μm. The first layer 120 can include a carrier layer to which the reaction accelerator is added. The carrier layer can consist for example of an organic resin, polyvinyl alcohol (PVA) and/or phenoxy resin or include the substances mentioned.

The reaction accelerator can for example include an imidazole, in particular 1-methylimidazole, 2-methylimidazole or 2-ethyl-4-methylimidazole (2E4Mlm) or of one or more other imidazole derivatives or adducts thereof with for example epoxy resin, or include urea or urea derivatives, a Lewis base (e.g. tertiary amines), a Lewis acid (e.g. $BF_3$) or include one or more of the substances mentioned. Furthermore, modified or heterocyclic amines may also be used as reaction accelerators. All of the substances mentioned may be present individually or as a mixture in the reaction accelerator.

The carrier layer serves to store the reaction accelerator, that is to say to prevent the reaction accelerator from escaping from the first layer 120 before the coupling with the second layer 130 is effected. The carrier layer material can store the reaction accelerator solely in a physical manner, for which purpose the carrier layer materials are suitable.

In particular for readily evaporable reaction accelerators having a low molar mass, the storage on a physical basis can optionally be improved by adding to the carrier layer material of the first layer 120 a small amount of adhesive, which promotes the storage of the reaction accelerator in the carrier layer via a chemical process. The amount of adhesive in this case is so small (for example, less than or equal to 20 vol. % or 10 vol. % of the first layer 120/the carrier layer) that there is neither a significant consumption of reaction accelerator nor a 3-dimensional crosslinking of the first layer 120/the carrier layer. The adhesive added can for example be the adhesive present in the second layer and/or another adhesive which interacts with the reaction accelerator.

The ratio of carrier layer material of the carrier layer (with or without a small proportion of adhesive) to reaction accelerator may for example be between 1/1 and 3/1 and in particular be approximately 2/1 (in vol. %).

The carrier layer material can additionally also contain further active substances, such as for example a crosslinker (e.g. from the group of the isocyanates).

For the second layer 130, what is known as a baking lacquer can for example be used. Baking lacquer layers are chemically curable, adhesive insulating lacquer layers which have been specially developed for the construction of electrical cores and have high dimensional stability, operational stability and high bonding forces. For example, it is possible to use what is known as Backlack-V®, which enables high bonding forces, a long duration of use due to low aging, an improved long-term behavior and a short baking time at reduced pressure. The second layer 130 can have a thickness D2 which is for example less than or greater than or equal to 4 µm, 6 µm, 8 µm, 10 µm, 12 µm or 15 µm.

The sheet metal strip 110 can for example be manufactured from steel. The thickness D3 of the sheet metal strip 100 can for example be greater than or less than or equal to 0.35 mm, 0.5 mm, 0.75 mm, 1.0 mm, 1.5 mm, 2.0 mm or 2.5 mm.

FIG. 3 illustrates by way of example a method 300 for producing components which are produced for example from the coated sheet metal strip 200. The coated sheet metal strip 200 can for example be in the form of a coil (winding, roll, spool) 310, which has been delivered for example by a steelworks to a customer.

In one method operation, the coated sheet metal strip 200 is separated into individual sheet metal laminations (sheet metal plates) 320. The separation can take place in a separation system 330, for example, by dividing the coated sheet metal strip 200 transversely. The sheet metal laminations 320 can then be cut to their final form.

At least two sheet metal laminations 320_1 and 320_2 are then stacked and adhesively bonded together by means of the adhesive-containing second layer 130. For this, at 340 at least two sheet metal laminations 320_1, 320_2 are stacked such that the second layer 130 of one sheet metal lamination 320_1 is facing the first layer 120 of the other sheet metal lamination 320_2, and are pressed together by applying an areal pressure (F) of from 0.5 to 10 MPa, in particular 2 to 5 MPa with the introduction of energy (by heat, UV radiation, infrared radiation or the like).

The adhesive in the second layer 130 is activated in the process, which may involve a chemical reaction, for example a 3-dimensional crosslinking of the adhesive. During the (thermal) adhesive bonding process, the reaction accelerator diffuses out from the first layer 120 into the adhesive of the second layer 130. The reaction accelerator (activator, catalyst) can bring about an enormous acceleration of the chemical reaction and hence of the adhesive bonding process.

The adhesive bonding at 340 can be effected by heating the compressed sheet metal laminations 320_1, 320_2 for example in an oven or a heatable press (not illustrated) to a temperature T, which is elevated compared to ambient temperature, of for example 100° C. to 250° C., in particular 80° C. to 150° C., as a result of which it is possible to initiate both the diffusion of the reaction accelerator into the second layer 130 and the activation of the adhesive. Other activation processes, which may for example involve the application of radiation energy, are likewise conceivable. After a short adhesive bonding time t, for example less than or equal to 20 min, 15 min, 10 min, 5 min, 1 min, the component is mechanically finalized and can be removed from the adhesive bonding system (e.g. oven or press). It is optionally possible for the adhesive bonding reaction to complete downstream of the press and still to continue outside of the tool.

In addition to the reaction acceleration, the use of the reaction accelerator brings about further advantages. Due to the short adhesive bonding time t, an improvement in the leakage behavior can be achieved, meaning that lateral emergence of adhesive at the adhesive gap is minimized. The reaction accelerator also makes it possible to initiate a more aging-resistant reaction mechanism, that is to say that the aging stability of the adhesive bond with reaction accelerator can be increased compared to an adhesive bond without a reaction accelerator (see also FIG. 6).

Figure 4:
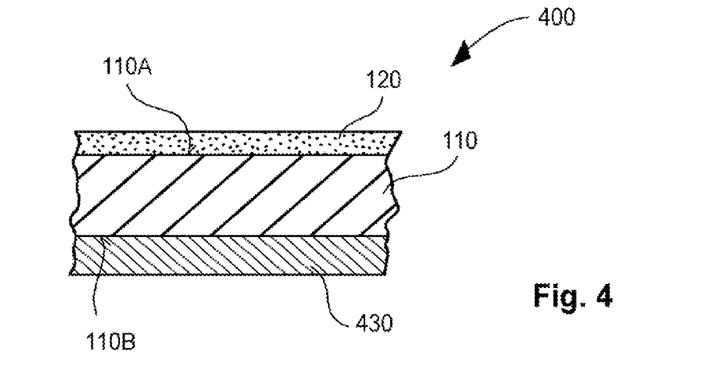
FIG. 4 is a cross section through a further sheet metal strip having a first layer with reaction accelerator and a third layer with insulating lacquer.

FIG. 4 shows a cross section through a further sheet metal strip 400 having a first layer 120 with reaction accelerator and an optional third layer 430 which includes or consists of an insulating lacquer.

To avoid repetitions, reference is made to the description above with regard to the sheet metal strip 110 and the first layer 120.

The insulating lacquer of the third layer 430 can for example be a C6 lacquer. In particular, for example, it is possible to use the Remisol EB500FF C6 lacquer. "FF" in this case stands for "formaldehyde-free" (i.e. free of formaldehyde emissions). A C5 lacquer or a C3 lacquer is likewise also employable, for example. The insulating lacquer of the third layer 430 can be adhesive-free.

Figure 5:
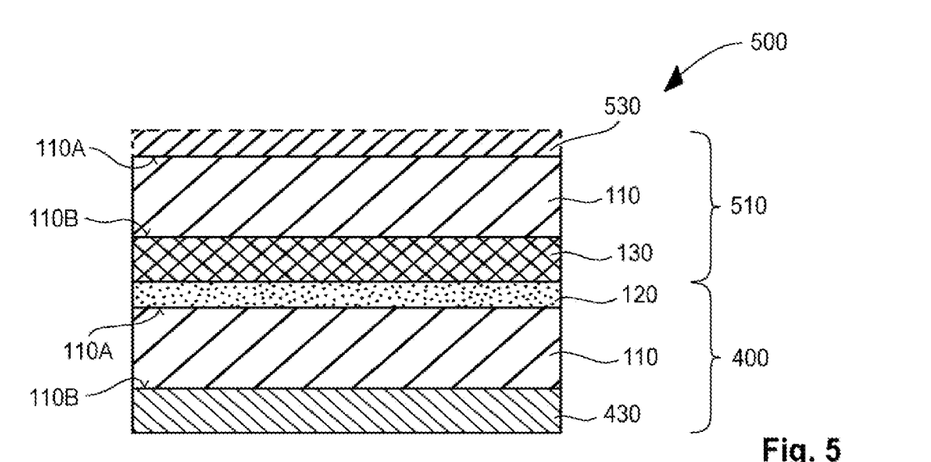
FIG. 5 is an example component which is produced from adhesively bonded-together laminations of the further sheet metal strip from FIG. 4 and of an adhesive-coated sheet metal strip.

FIG. 5 shows an example component 500 which is produced from adhesively bonded-together laminations of the further sheet metal strip 400 with depot coating (see FIG. 4) and of an adhesive-coated sheet metal strip 510.

The adhesive-coated sheet metal strip 510 can include a sheet metal strip 110 and a second layer 130 which is arranged over the second flat side 110B of the sheet metal strip 110, which can be designed in accordance with the description hereinabove. In contrast to the coated sheet metal strip 200, however, the adhesive-coated sheet metal strip 510 does not have a first layer 120 (depot coating). Instead, the first flat side 110A of the sheet metal strip 110 can either be uncoated or possibly can be coated with an insulating lacquer coating 530 corresponding to the third layer 430.

To produce the component 500 shown in FIG. 5, two different sheet metal strips—typically supplied in the form of two coils—are therefore required, one coil (not illustrated) containing the sheet metal strip 400 with the depot coating and the other coil (not illustrated) containing the sheet metal strip 510 with the adhesive coating.

The adhesive bonding is then effected analogously to that which was explained with reference to FIG. 3, where here, too, contact between the reaction accelerator and the adhesive does not take place until during the adhesive bonding process and hence the same features, properties and advantages as described above are present and achieved.

The components illustrated by means of FIGS. 3 and 5 can in all example embodiments contain substantially more than the two adhesively-bonded sheet metal laminations depicted and can for example be produced by a stack of a large number (e.g. greater than or equal to 10, 50, 100, etc.) of sheet metal laminations.

Figure 6:
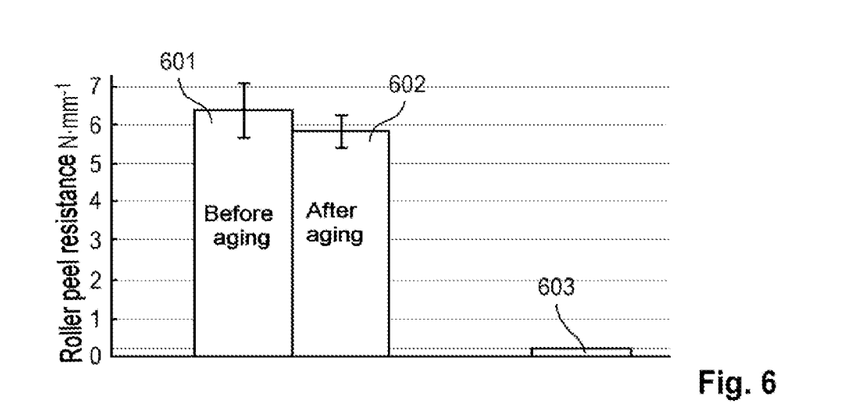
FIG. 6 illustrates in an example manner the roller peel resistance (in N/mm) of specimens including two adhesively bonded sheet metal strips directly after the adhesive bonding and also after aging.

The graph in FIG. 6 illustrates the results of experiments showing the roller peel resistance (in N/mm) of specimens including two adhesively bonded sheet metal strips directly after the adhesive bonding and also after aging. The roller peel resistance is a measure of the tearing force required to tear the two adhesively bonded sheet metal strips apart.

The adhesive bonding temperature T was 150° C. during the experiments, an adhesive bonding time t of 10 min was awaited and a pressing force (F) of 3 MPa was applied. As reaction accelerator, 2E4Mlm was used in the first layer 120, the second layer 130 was a Backlack-V® layer.

The results of the experiments show that with these parameters a high-strength bond of the sheet metal strips, with tearing forces on average above 6 N/mm, was achieved directly after the adhesive bonding (bar 601). After aging for 1 month (bar 602), the strength values lay within the same region (see experimental tolerances), that is to say that a significant deterioration in the adhesive bond as a result of aging could not be detected.

In comparison, without a depot coating (i.e. without the use of the reaction accelerator) it was not possible to achieve any usable adhesive bond with these parameters (see right-hand bar 603).

It can be assumed that the results illustrated by reference to experiments in FIG. 6 represent generally valid statements which are transferable to all example embodiments described within this disclosure.

A description has been provided with reference to embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV,* 358 F3d 870, 69 USPQ2d 1865 (Fed. Cir. 2004).

The invention claimed is:

1. A coated sheet metal strip, comprising:
   a rolled sheet metal strip having a first flat side and a second flat side;
   a first layer over the first flat side, wherein the first layer includes a carrier layer, the carrier layer applied directly to the sheet metal strip and containing a reaction accelerator embedded in the carrier layer for an adhesive and stores the reaction accelerator on a physical basis, wherein a ratio in volume of carrier layer material of the carrier layer to the reaction accelerator is between 1/1 and 3/1; and
   a second layer over the second flat side and including the adhesive, wherein the second layer is free of the reaction accelerator or any reaction accelerator.

2. The coated sheet metal strip as claimed in claim 1, wherein the carrier layer includes an organic resin, polyvinyl alcohol, and/or phenoxy resin.

3. The coated sheet metal strip as claimed in claim 1, wherein
   the reaction accelerator includes a urea or a urea derivative, a Lewis base, a Lewis acid, an imidazole, or modified or heterocyclic amines,
   the Lewis base includes tertiary amines,
   the Lewis acid includes $BF_3$, and
   the imidazole includes 1-methylimidazole, 2-methylimidazole, 2-ethyl-4-methylimidazole, or other imidazole derivatives or imidazole adducts.

4. The coated sheet metal strip as claimed in claim 1, wherein
   the second layer is an epoxy resin-based layer and/or a baking lacquer layer, and
   the baking lacquer layer includes an epoxy resin-based baking lacquer layer.

5. The coated sheet metal strip as claimed in claim 1, wherein the first layer is free of adhesive.

6. The coated sheet metal strip as claimed in claim 1, wherein the first layer includes less than or equal to 20 vol. % adhesive.

7. The coated sheet metal strip as claimed in claim 1, wherein the first layer includes more than or equal to 20 vol. % adhesive.

8. The coated sheet metal strip as claimed in claim 1, wherein the thickness of the first layer is less than or equal to 2 μm.

9. The coated sheet metal strip as claimed in claim 1, wherein the first layer is free of mineral fillers.

10. The coated sheet metal strip as claimed in claim 1, wherein the thickness of the second layer is greater than or equal to 4 μm.

11. The coated sheet metal strip as claimed in claim 1, wherein the sheet metal strip is an electrical sheet strip.

12. The coated sheet metal strip as claimed in claim 1, wherein the coated sheet metal strip is wound into a coil.

13. The coated sheet metal strip as claimed in claim 1, wherein the first layer consists of the carrier layer.

14. A method for producing a coated sheet metal strip, comprising:
   applying a first layer over a first flat side of a rolled sheet metal strip, wherein the first layer includes a carrier layer, the carrier layer applied directly to the sheet metal strip and containing a reaction accelerator embedded in the carrier layer for an adhesive, and stores the reaction accelerator on a physical basis, wherein a ratio in volume of carrier layer material of the carrier layer to the reaction accelerator is between 1/1 and 3/1; and
   applying a second layer, which includes the adhesive, over a second flat side of the rolled sheet metal strip, wherein the second layer is free of the reaction accelerator or any reaction accelerator.

15. The method as claimed in claim 14, wherein the carrier layer includes an organic resin, polyvinyl alcohol, and/or phenoxy resin.

16. The method as claimed in claim 14, wherein the first layer is applied by roller application.

17. The method as claimed in claim 14, wherein the second layer is applied by roller application.

18. The method as claimed in claim 14, further comprising:
   drying the coated sheet metal strip at a drying temperature of less than or equal to 280° C.

19. The method as claimed in claim 14, wherein the first layer consists of the carrier layer.

\* \* \* \* \*